Patented July 17, 1951

2,561,205

UNITED STATES PATENT OFFICE 2,561,205

ACETOACETIC AMIDE OF β,γ-ETHYLENICALLY UNSATURATED AMINES

Giffin D. Jones, Easton, Pa., assignor to General Aniline & Film Corporation, New York, N. Y., a corporation of Delaware No Drawing. Application May 2, 1947, Serial No. 745,649

2 Claims. (Cl. 260—561)

This invention relates to the production of amides of β-oxocarboxylic acids and β,γ-ethylenically unsaturated lower aliphatic amines and is particularly concerned with the production of N-allylacetoacetamides, and interpolymers of such amides with the common polymerizable vinyl and vinylidene monomers.

I have discovered that these novel amides of β-oxocarboxylic acids and β,γ-ethylenically unsaturated lower aliphatic amines can be prepared conveniently by acylating a β,γ-ethylenically unsaturated lower aliphatic amine with an acylating agent containing an oxocarbonyl group in the acyl residue in an inert solvent and at a temperature preferably within the range of —30° C. to 25° C., although the reaction can be effected at temperatures ranging from about —80° C. to about 60° C. The thus-obtained amide can then be isolated by any suitable means such as fractional distillation. The course of the reaction, as well as the type of reactants which may be used therein and the type of products produced are illustrated in the following equation:

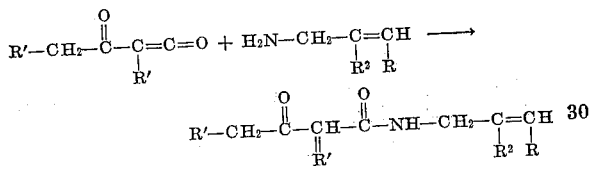

in which R stands for hydrogen or methyl, R' is hydrogen or a hydrocarbon radical which may be aliphatic or aromatic and R² is hydrogen, methyl or halogen, preferably chlorine.

As indicated by the above equation, by selection of the specific acylating agent containing an oxocarbonyl group in the acyl residue and the specific β,γ-ethylenically unsaturated lower aliphatic amine which are employed in the reaction, a wide variety of the novel amides of this invention corresponding to the particular reactants employed can be obtained. These novel amides of the β-oxocarboxylic acids with a β,γ-ethylenically unsaturated lower aliphatic amine are useful in a larger number of applications. Thus, they may be interpolymerized with the common polymerizable vinyl and vinylidene monomers to obtain modified interpolymers, some of which, as more fully described below, are of particular value for the production of thermo-reversible gels which are useful as gelatin substitutes, especially in photography. Further, the amides of this invention are useful as intermediates for the preparation of other compounds and as ingredients in pesticidal compositions.

The acylating agents containing an oxocarbonyl in the acyl residue and having the general formula indicated in the above equation, which can be used for acylating the β,γ-ethylenically unsaturated amines are suitably the 1-butene-1,3-diones, examples of which are 1-butene-1,3-dione, 2,4-dimethyl-1-butene-1,3-dione, 2,4-diisopropyl-1-butene-1,3-dione, 2,4-di-n-butyl-1-butene-1,3-dione, 2-n-butyl-4-methyl-1-butene-1,3-dione, 4-n-butyl-2-methyl-1-butene-1,3-dione, 2-n-hexyl-4-methyl-1-butene-1,3-dione, 4-n-decyl-1-butene-1,3-dione, 2,4-di-n-hexyl-1-butene-1,3-dione, 2,4-di-n-decyl-1-butene-1,3-dione, 2,4-di-hexadecyl-1-butene-1,3-dione, 2,4-diphenyl-1-butene-1,3-dione, 2,4-di-(7,8-hexadecenyl)-1-butene-1,3-dione. The 1-butene-1,3-diones are of the general formula:

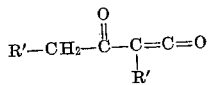

wherein R' is hydrogen or a hydrocarbon radical which may be aliphatic or aromatic.

As examples of β,γ-ethylenically unsaturated lower aliphatic amines, there may be mentioned allylamine, α-chloro-allylamine

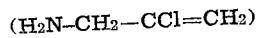

methallylamine, crotylamine, etc.

As previously stated, the reaction for the production of the novel amides of this invention is carried out in the presence of an inert solvent and as examples of inert solvents which can be employed in the process of this invention, there may be mentioned the lower aliphatic ethers, such as diethyl ether, diisopropyl ether, diisobutyl ether, di-n-butyl ether, dioxane; the aliphatic, cycloaliphatic and aromatic hydrocarbons, e. g. propane, the butanes, the pentanes, the hexanes, the heptanes, the octanes, etc. and mixtures thereof, cyclohexane, methylcyclohexane, benzene, toluene, xylene; dimethylformamide and pyridine.

The following specific example illustrates the details of preferred specific embodiments of this invention. The parts are by weight.

Example

To a solution of 83 parts of diketene dissolved in 150 parts of absolute ether was added dropwise 57 parts of anhydrous allylamine during the course of about ½ hour, while maintaining the temperature at about 0° C. Upon distillation of the reaction mixture, N-allylacetoacetamide, a pale yellow liquid boiling at 122-125° C./1 mm. was obtained. It solidified to a yellow solid melting at 28° C.

A mixture of 1.5 parts of N-allylacetoacetamide and 10 parts of acrylamide dissolved in 30 parts tert.-butyl alcohol was polymerized by heating at 40° C., using ultraviolet light as the activator. The white polymer obtained was water-soluble. A similar polymer was obtained by polymerizing a mixture of the same composition by heating the mixture at 50° C., using 0.01 part of benzoyl peroxide as the catalyst.

To 1 part of a 10% solution of the interpolymer in water was added 0.2 part of a 2% aqueous solution of adipodihydrazide (acidified with a small amount of acetic acid) to obtain a thermally reversible gel.

A mixture of 25 parts of acrylamide, 25 parts of vinyl acetate and 1 part of N-allylacetoacetamide dissolved in 20 parts of tert.-butyl alcohol was added to 100 parts of an aqueous solution containing 0.5 part of dipotassium phosphate, 0.5 part of ammonium persulfate, 0.5 part of sodium meta-bisulfite and 3 parts of sodium cetyl sulfate. The pH of the emulsion was adjusted to 7.0 by the addition of a few drops of dilute aqueous potassium hydroxide. An acrylamide/vinyl acetate/N-allylacetoacetamide interpolymer was obtained after heating the aqueous emulsion at 60° C. for about ½ hour. A 10% aqueous solution of the interpolymer was clear and slightly viscous.

As indicated by the above example, the novel amides of $\beta$-oxocarboxylic acids with $\beta,\gamma$-ethylenically unsaturated lower aliphatic amines are readily polymerized with common polymerizable vinyl and vinylidene monomers containing a single $>C=CH_2$ group. These novel interpolymers are readily obtained by mixing the novel amides of the present invention with common polymerizable vinyl and vinylidene monomers and subjecting the mixture to the usual polymerization conditions for such vinyl and vinylidene monomers. Thus, the bulk, solution or emulsion vinyl polymerization techniques, employing ultra-violet light or peroxide type vinyl polymerization catalysts or initiators, are effective for carrying out the interpolymerization. The novel interpolymers thus obtained contain an acetoacetic acid radical which substantially modifies the properties of the resultant interpolymer or resin. Thus, these novel resins are valuable as non-diffusing color coupling components for the production of yellow azo methine dyes in certain color photography processes. As examples of such other vinyl and vinylidene monomers with which these novel amides may be polymerized to form novel interpolymers may be mentioned common polymerizable vinyl esters such as vinyl acetate, vinyl propionate, vinyl butyrate and the like, vinyl halides, vinyl ethers, acrylic acid and its esters and especially acrylamide and amides of other $\alpha,\beta$-ethylenically unsaturated monocarboxylic acids such as methacrylamide, $\alpha$-chloroacrylamide, $\alpha$-fluoroacrylamide and $\alpha$-bromoacrylamide of the general formula:

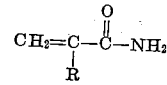

in which R is hydrogen, lower alkyl (preferably methyl) or halogen (preferably chlorine). I have found that the novel interpolymers obtained by interpolymerization of the novel amides of the present invention along with the above-defined amides of $\alpha,\beta$-ethylenically unsaturated monocarboxylic acids in which the amount of novel amide of the present invention varied from 5% to 40% of the amount of the other amide are of particular value for use in the production of thermo-reversible gels by treating the thus-obtained resin with a polyhydrazide, as more fully described in my copending application Serial No. 745,651, filed May 2, 1947, now Patent No. 2,555,646, issued June 5, 1951. As indicated by the above example, these interpolymers, which are useful in the production of thermo-reversible gels, are readily obtainable by the usual polymerization techniques employed in polymerizing acrylamide and similar amides of $\alpha,\beta$-ethylenically unsaturated monocarboxylic acids, the polymerization advantageously being carried out in an inert solvent or aqueous emulsion, using ultraviolet light or peroxide type vinyl polymerization catalyst or initiator.

I claim:

1. N-allylacetoacetamides of the formula:

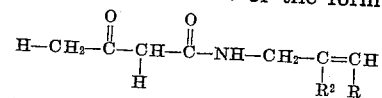

in which R represents a member of the group consisting of hydrogen and methyl and $R^2$ represents a member of the group consisting of hydrogen, methyl and halogen.

2. N-allylacetoacetamide.

GIFFIN D. JONES.

REFERENCES CITED

The following references are of record in the file of this patent:

UNITED STATES PATENTS

| Number | Name | Date |
| --- | --- | --- |
| 2,152,132 | Boese | Mar. 28, 1939 |
| 2,174,239 | Gleason | Sept. 26, 1939 |
| 2,311,548 | Jacobson et al. | Feb. 16, 1943 |
| 2,323,391 | Goodman | July 6, 1943 |
| 2,323,938 | Sauer | July 13, 1943 |
| 2,431,468 | Davis | Nov. 25, 1947 |
| 2,462,358 | Caldwell | Feb. 22, 1949 |

OTHER REFERENCES

Kaslow et al.: J. Am. Chem. Soc., vol. 67, November 1945 (p. 1970).